US012410491B2

(12) United States Patent
Yang et al.

(10) Patent No.: US 12,410,491 B2
(45) Date of Patent: Sep. 9, 2025

(54) HIGH-STRENGTH STEEL SHEET AND METHOD FOR PRODUCING THE SAME

(71) Applicant: JFE Steel Corporation, Tokyo (JP)

(72) Inventors: Lingling Yang, Tokyo (JP); Tatsuya Nakagaito, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1076 days.

(21) Appl. No.: 17/425,440

(22) PCT Filed: Oct. 18, 2019

(86) PCT No.: PCT/JP2019/041131
§ 371 (c)(1),
(2) Date: Jul. 23, 2021

(87) PCT Pub. No.: WO2020/158065
PCT Pub. Date: Aug. 6, 2020

(65) Prior Publication Data
US 2022/0098696 A1 Mar. 31, 2022

(30) Foreign Application Priority Data
Jan. 30, 2019 (JP) ................................ 2019-013796

(51) Int. Cl.
| C21D 9/46 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C23C 2/06 | (2006.01) |
| C23C 2/28 | (2006.01) |
| C23C 2/40 | (2006.01) |

(52) U.S. Cl.
CPC ............ *C21D 9/46* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/28* (2013.01); *C23C 2/40* (2013.01); *C21D 2211/002* (2013.01); *C21D 2211/005* (2013.01); *C21D 2211/008* (2013.01); *C21D 2211/009* (2013.01)

(58) Field of Classification Search
None
See application file for complete search history.

(56) References Cited

U.S. PATENT DOCUMENTS

| 8,828,557 | B2 | 9/2014 | Takagi et al. |
| 9,708,679 | B2 | 7/2017 | Kawata et al. |
| 10,920,294 | B2 | 2/2021 | Kohsaka et al. |
| 2011/0030854 | A1 | 2/2011 | Matsuda et al. |
| 2012/0222781 | A1 | 9/2012 | Azuma et al. |
| 2014/0193665 | A1 | 7/2014 | Kawata et al. |
| 2014/0212684 | A1* | 7/2014 | Kawata .................... C23C 2/02 148/533 |
| 2018/0016656 | A1 | 1/2018 | Minami et al. |
| 2019/0003009 | A1 | 1/2019 | Kawata et al. |
| 2019/0360081 | A1 | 11/2019 | Minami et al. |
| 2022/0098696 | A1 | 3/2022 | Yang et al. |

FOREIGN PATENT DOCUMENTS

| CN | 103857814 A | 6/2014 |
| CN | 107109571 A | 8/2017 |
| EP | 2738280 A1 | 6/2014 |
| EP | 2762579 A1 | 8/2014 |
| EP | 2762589 A1 | 8/2014 |
| EP | 3219821 A1 | 9/2017 |
| EP | 3508599 A1 | 7/2019 |
| EP | 3521474 A1 | 8/2019 |
| EP | 3556881 A1 | 10/2019 |
| EP | 3653745 A1 | 5/2020 |

(Continued)

OTHER PUBLICATIONS

Korean Written Decision on Registration for Korean Application No. 10-2021-7023746, dated Dec. 14, 2022 with translation, 4 pages.
Extended European Search Report for European Application No. 19 912 842.2, dated Feb. 18, 2022, 8 pages.
International Search Report and Written Opinion for International Application No. PCT/JP2019/041131, dated Jan. 7, 2020, 5 pages.
Chinese Office Action with Search Report for Chinese Application No. 201980090584.7, dated May 6, 2022, 7 pages including 2 pages of English Translation.
Extended European Search Report for European Application No. 19912354.8, dated Mar. 21, 2022, 8 pages.

(Continued)

*Primary Examiner* — Sally A Merkling
*Assistant Examiner* — Danny N Kang
(74) *Attorney, Agent, or Firm* — Buchanan Ingersoll & Rooney PC

(57) ABSTRACT

A high-strength steel sheet that has a predetermined component composition, that has a steel microstructure in which, in a thickness cross-section in a rolling direction, an area percentage of ferrite ranges from 5% to 30%, a total area percentage of tempered martensite and bainite ranges from 40% to 90%, pearlite constitutes 0% to 5%, a total area percentage of fresh martensite and retained γ ranges from 5% to 30%, a ratio of a total area percentage of the fresh martensite and the retained γ to a total area percentage of the tempered martensite, bainite, and pearlite is 0.5 or less, and a ratio of the fresh martensite and the retained γ adjacent to the ferrite with respect to the fresh martensite and the retained γ is 30% or more in total area percentage, and that has a yield strength of 550 MPa or more.

6 Claims, No Drawings

(56) References Cited

FOREIGN PATENT DOCUMENTS

| | | |
|---|---|---|
| EP | 3663425 A1 | 6/2020 |
| JP | 04120242 A | 4/1992 |
| JP | 2011111673 A | 6/2011 |
| JP | 2011168880 A | 9/2011 |
| JP | 4924730 B2 | 4/2012 |
| JP | 5354135 B2 | 11/2013 |
| JP | 2016141858 A | 8/2016 |
| JP | 2016188395 A1 | 11/2016 |
| JP | 6292353 B2 | 3/2018 |
| JP | 6315154 B1 | 4/2018 |
| JP | 2018131648 A | 8/2018 |
| JP | 6443594 B1 | 12/2018 |
| KR | 20140041833 A | 4/2014 |
| WO | 2011065591 A1 | 6/2011 |
| WO | 2013018726 A1 | 2/2013 |
| WO | 2013018739 A1 | 2/2013 |
| WO | 2016103534 A1 | 6/2016 |
| WO | 2017108959 A1 | 6/2017 |
| WO | 2017164346 A1 | 9/2017 |
| WO | 2018043452 A1 | 3/2018 |
| WO | 2018062342 A1 | 4/2018 |
| WO | 2018159405 A1 | 9/2018 |

OTHER PUBLICATIONS

International Search Report and Written Opinion for International Application No. PCT/JP2019/041132, dated Jan. 7, 2020, 4 pages.
Korean Written Decision on Registration for Korean Application No. 10-2021-7023747, dated Dec. 14, 2022 with translation, 4 pages including 2 pages of English Translation.
Non Final Office Action issued by the U.S. Patent and Trademark Office in U.S. Appl. No. 17/425,453, mailed May 22, 2024, U.S. Patent and Trademark Office, Alexandria, VA, 12 pages.

* cited by examiner

HIGH-STRENGTH STEEL SHEET AND METHOD FOR PRODUCING THE SAME

CROSS REFERENCE TO RELATED APPLICATIONS

This is the U.S. National Phase application of PCT/JP2019/041131 filed Oct. 18, 2019, which claims priority to Japanese Patent Application No. 2019-013796, filed Jan. 30, 2019, the disclosures of these applications being incorporated herein by reference in their entireties for all purposes.

FIELD OF THE INVENTION

The present invention relates to a high-strength steel sheet used mainly as an automotive component and a method for producing the high-strength steel sheet and more particularly to a high-strength steel sheet having a yield strength of 550 MPa or more, and excellent in resistance to shear burrs and workability, and a method for producing the high-strength steel sheet.

BACKGROUND OF THE INVENTION

In recent years, in the moving body industry, for example, in the automobile industry, from the perspective of protecting the global environment, improved fuel efficiency of automobiles has always been an important issue to reduce carbon dioxide ($CO_2$) emission. To improve the fuel efficiency of automobiles, it is effective to decrease the weight of automotive bodies, and it is necessary to decrease the weight of automotive bodies while maintaining the strength of the automotive bodies. Weight reduction can be achieved by reinforcing a steel sheet used as a material for automotive components, simplifying the structure, and decreasing the number of components.

With reinforcement of a steel sheet, however, degradation of an apparatus for processing the steel sheet becomes a problem. When a steel sheet is sheared, wear and a nicked edge of a tool, particularly a shortened tool life due to shear burrs of the steel sheet, have become problems. In view of such a background, various techniques have been proposed as techniques for suppressing the formation of burrs while shearing.

For example, Patent Literature 1 discloses a cold-rolled steel sheet with high resistance to burr and drawability during press forming and a method for producing the cold-rolled steel sheet. Patent Literature 2 discloses a high-strength cold-rolled steel sheet with good mechanical cutting properties and with a maximum tensile strength of 900 MPa or more and a method for producing the high-strength cold-rolled steel sheet, and a high-strength galvanized steel sheet and a method for producing the high-strength galvanized steel sheet. Patent Literature 3 discloses a high-strength hot-dip galvanized steel sheet excellent in mechanical cutting properties, a high-strength alloyed hot-dip galvanized steel sheet, and a method for producing these steel sheets. Patent Literature 4 discloses a high-strength hot-dip galvanized steel sheet with high resistance to burr and a method for producing the high-strength hot-dip galvanized steel sheet.

PATENT LITERATURE

PTL 1: Japanese Unexamined Patent Application Publication No. 4-120242

PTL 2: Japanese Unexamined Patent Application Publication No. 2011-111673

PTL 3: Japanese Patent No. 5354135

PTL 4: Japanese Unexamined Patent Application Publication No. 2011-168880

SUMMARY OF THE INVENTION

In the cold-rolled steel sheet of Patent Literature 1, inclusions, such as phosphide and sulfide, are dispersed so that the inclusions act as starting points for void formation while punching and thereby decrease the burr height. The active addition of S or P, however, reduces weldability and leaves a problem in practical applications.

In the high-strength steel sheet of Patent Literature 2 and the high-strength hot-dipped steel sheet of Patent Literature 3, an oxide is dispersed in the surface layer of the steel sheet to improve mechanical shear properties. The dispersed oxide, however, acts as a starting point for crack formation while processing and impairs formability, thus leaving a problem in practical applications.

The high-strength hot-dip galvanized steel sheet of Patent Literature 4 has the problems of insufficient strength and difficulty in being used for higher-strength components.

Aspects of the present invention advantageously solve these problems of the related art and aim to provide a high-strength steel sheet that reduces shear burrs and has high workability and a method for producing the high-strength steel sheet.

To achieve the above objects, the present inventors have studied a steel sheet microstructure before shearing and have completed the present invention by finding that a ductile steel sheet that seldom forms shear burrs can be produced by optimizing the component composition, then optimizing the proportion of fresh martensite in the steel sheet microstructure, and optimizing adjacent microstructures.

Aspects of the present invention are based on such findings and more specifically provide the following.

[1] A high-strength steel sheet that has a component composition containing, on a mass percent basis: C: 0.07% to 0.25%, Si: 0.01% to 1.80%, Mn: 1.8% to 3.2%, P: 0.05% or less, S: 0.02% or less, Al: 0.01% to 2.0%, and N: 0.01% or less; at least one of B: 0.0001% to 0.005%, Ti: 0.005% to 0.04%, and Nb: 0.005% to 0.06%; and a balance being Fe and incidental impurities, that has a steel microstructure in which, in a thickness cross-section in a rolling direction, an area percentage of ferrite ranges from 5% to 30%, a total area percentage of tempered martensite and bainite ranges from 40% to 90%, pearlite constitutes 0% to 5%, a total area percentage of fresh martensite and retained γ ranges from 5% to 30%, a ratio of a total area percentage of the fresh martensite and the retained γ to a total area percentage of the tempered martensite, bainite, and pearlite is 0.5 or less, and a ratio of the fresh martensite and the retained γ adjacent to the ferrite with respect to the fresh martensite and the retained γ is 30% or more in total area percentage, and that has a yield strength of 550 MPa or more.

[2] The high-strength steel sheet according to [1], further containing: in addition to the component composition, at least one of Mo: 0.03% to 0.50% and Cr: 0.1% to 1.0% in a total of 1% or less on a mass percent basis.

[3] The high-strength steel sheet according to [1] or [2], further containing: in addition to the component composition, a total of 0.5% or less of at least one of Cu, Ni, Sn, As, Sb, Ca, Mg, Pb, Co, Ta, W, REM, Zn, V, Sr, Cs, and Hf on a mass percent basis.

[4] The high-strength steel sheet according to any one of [1] to [3], further including a coated layer on a surface of the steel sheet.

[5] The high-strength steel sheet according to [4], wherein the coated layer is a hot-dip galvanized layer or an alloyed hot-dip galvanized layer.

[6] A method for producing a high-strength steel sheet, including:

a hot-rolling step of hot-rolling a steel slab with the component composition according to any one of [1] to [3], cooling the hot-rolled steel sheet at an average cooling rate in the range of 10° C./s to 30° C./s, and coiling the hot-rolled steel sheet at a coiling temperature in the range of 400° C. to 700° C.;

a cold-rolling step of cold-rolling the hot-rolled steel sheet formed in the hot-rolling step; and an annealing step of reverse bending the cold-rolled steel sheet formed in the cold-rolling step with a roll 800 mm or less in radius two to five times in total in a temperature range of 600° C. to an annealing temperature, then annealing the cold-rolled steel sheet in an annealing temperature range of 750° C. to 900° C. for an annealing time in the range of 30 to 200 seconds, cooling the cold-rolled steel sheet from the annealing temperature to a temperature range of 200° C. to 340° C. at an average cooling rate of 10° C./s or more, reheating the cold-rolled steel sheet to a temperature range of 350° C. to 600° C., and holding the temperature for 10 to 300 seconds.

[7] The method for producing a high-strength steel sheet according to [6], further including a coating step of performing a coating treatment after the annealing step.

[8] The method for producing a high-strength steel sheet according to [7], wherein the coating treatment is a hot-dip galvanizing treatment or a galvannealing treatment.

Aspects of the present invention can provide a high-strength steel sheet excellent in resistance to shear burrs and workability.

The high-strength in accordance with aspects of the present invention refers to a yield strength (yield point, YP) of 550 MPa or more.

DETAILED DESCRIPTION OF EMBODIMENTS OF THE INVENTION

Aspects of the present invention are specifically described below. The present invention is not limited to the following embodiments.

A steel sheet according to aspects of the present invention has a particular component composition and a particular steel microstructure. Thus, a steel sheet according to aspects of the present invention is described below in the order of the component composition and steel microstructure.

A steel sheet according to aspects of the present invention has the following component composition. The unit "%" of the component content in the following description means "% by mass".

C: 0.07% to 0.25%

C is an element necessary to form martensite and increase strength. To ensure a high strength of 550 MPa or more, which is a desired yield strength, the C content should be 0.07% or more. A C content of less than 0.07% results in the formation of martensite and a yield strength of less than 550 MPa. A C content of less than 0.07% also results in the formation of less fresh martensite and many burrs. On the other hand, a C content of more than 0.25% results in an excessively increased strength and promoted formation of carbides. Carbides act as a starting point for void formation while processing and reduces workability. Thus, the C content is limited to the range of 0.07% to 0.25%, preferably 0.09% or more, preferably 0.20% or less, more preferably 0.11% or more, more preferably 0.16% or less.

Si: 0.01% to 1.80%

Si is an element that increases the hardness of steel sheets by solid-solution strengthening. To stably ensure high yield strength, the Si content should be 0.01% or more. A Si content of more than 1.80%, however, tends to result in the formation of openings along segregates while shearing due to segregation and results in significant formation of burrs. Thus, the upper limit is 1.80%, preferably 0.3% or more, preferably 1.2% or less, more preferably 0.5% or more, more preferably 1.1% or less.

Mn: 1.8% to 3.2%

Mn is an element that increases the hardness of steel sheets. Mn is also an element that suppresses ferrite transformation and bainite transformation, forms martensite, and thereby increases the strength of the material. Mn can also promote the formation of fresh martensite and suppress the formation of burrs. Thus, the Mn content should be 1.8% or more. A high Mn content, however, tends to result in the segregation of Mn and the formation of voids along segregates while processing and results in poor workability. Thus, the upper limit of Mn is 3.2%, preferably 2.3% or more, preferably 3.0% or less, more preferably 2.5% or more, more preferably 2.9 or less %.

P: 0.05% or Less

P segregates at grain boundaries and reduces workability. Thus, the P content is 0.05% or less, preferably 0.03% or less, more preferably 0.02% or less. Although not particularly specified, the lower limit is preferably 0.0005% or more from the perspective of the economic efficiency of melting.

S: 0.02% or Less

S binds to Mn, forms coarse MnS, and acts as a starting point for void formation while processing. Thus, the S content is preferably decreased and may be 0.02% or less, preferably 0.01% or less, more preferably 0.002% or less. Although not particularly specified, the lower limit is preferably 0.0001% or more from the perspective of the economic efficiency of melting.

Al: 0.01% to 2.0%

Al is an element that acts as a deoxidizer. Al may suppress the precipitation of cementite, and the Al content should be 0.01% or more to obtain this effect. An Al content of more than 2.0%, however, results in the formation of coarse oxide or nitride aggregates, which acts as starting points for void formation while processing. Thus, the Al content is 2.0% or less, preferably 0.03% or more, preferably 0.1% or less.

N: 0.01% or Less

In accordance with aspects of the present invention, N is a harmful element and is preferably minimized. N binds to Ti and forms TiN. A N content of more than 0.01% results in an increased amount of TiN formed, which acts as a starting point for void formation while processing and reduces workability. Thus, the N content is 0.01% or less, preferably 0.006% or less. Although not particularly specified, the lower limit is preferably 0.0005% or more from the perspective of the economic efficiency of melting.

At Least One of B: 0.0001% to 0.005%, Ti: 0.005% to 0.04%, and Nb: 0.005% to 0.06%

B: 0.0001% to 0.005%

B segregates at austenite grain boundaries, retards ferrite transformation after rolling, and promotes the formation of fresh martensite. To sufficiently produce these effects, the B content should be 0.0001% or more. A B content of more than 0.005%, however, results in the formation of $Fe_{23}(CB)_6$, which acts as a starting point for void formation while processing and reduces workability. Thus, the B content is limited to the range of 0.0001% to 0.005%.

Ti: 0.005% to 0.04%

Ti binds to N, forms a nitride, suppresses the formation of BN, induces the effects of B, forms TiN and makes crystal grains finer, and contributes to the reinforcement of steel sheets. To produce these effects, the Ti content should be 0.005% or more. A content of more than 0.04%, however, tends to result in the formation of a carbide containing coarse Ti and results in an undesirable tensile strength. Thus, the Ti content is limited to the range of 0.005% to 0.04%.

Nb: 0.005% to 0.06%

Nb is an element that further enhances the advantages according to aspects of the present invention. Nb can decrease the size of martensite, increase the amount of remaining fresh martensite, and suppress the formation of burrs. To obtain these effects, the Nb content should be 0.005% or more. A Nb content of more than 0.06%, however, results in precipitation of Nb carbide, which acts as a starting point for void formation while processing and reduces workability. Thus, the Nb content is limited to 0.06% or less, preferably 0.01% or more, preferably 0.04% or less.

These are base components. A high-strength steel sheet according to aspects of the present invention has a component composition that contains the base components and the balance being Fe (iron) and incidental impurities other than the base components. A high-strength steel sheet according to aspects of the present invention preferably has a component composition that contains the base components and the balance composed of Fe and incidental impurities.

A high-strength steel sheet according to aspects of the present invention may contain the following components as optional in addition to the above component composition.

A high-strength steel sheet according to aspects of the present invention may contain at least one of Mo: 0.03% to 0.50% and Cr: 0.1% to 1.0% in a total of 1% or less as an optional element in addition to the above component composition. When at least one of Mo and Cr constitutes more than 1% in total, the ferrite fraction is low, and fresh martensite increases. Thus, at least one of Mo and Cr is preferably 1% or less in total.

Mo: 0.03% to 0.50%

Mo promotes the nucleation of austenite and makes martensite finer. To obtain these effects, Mo, if present, constitutes 0.03% or more. Segregation of Mo at grain boundaries stops the grain growth of ferrite and decreases the ferrite fraction. To prevent this, Mo, if present, constitutes 0.50% or less, preferably 0.30% or less.

Cr: 0.1% to 1.0%

Cr is an element that has an effect of suppressing temper embrittlement. Thus, Cr further enhances the advantages according to aspects of the present invention. Thus, Cr, if present, constitutes 0.1% or more. A Cr content of more than 1.0%, however, results in the formation of Cr carbide and reduces workability. Thus, Cr, if present, constitutes 1.0% or less.

A high-strength steel sheet according to aspects of the present invention may further contain, as an optional element, a total of 0.5% or less, preferably 0.1% or less, more preferably 0.03% or less, of at least one of Cu, Ni, Sn, As, Sb, Ca, Mg, Pb, Co, Ta, W, REM, Zn, V, Sr, Cs, and Hf, in addition to the above component composition.

Although the component composition of a high-strength steel sheet according to aspects of the present invention is described above, to produce the desired advantages according to aspects of the present invention, it is insufficient to only adjust the component composition in the above ranges, and it is important to control the steel microstructure to satisfy specific ranges.

A steel microstructure in accordance with aspects of the present invention is described below. A steel microstructure in accordance with aspects of the present invention is a microstructure in a thickness cross-section in the rolling direction.

Area Percentage of Ferrite: 5% to 30%

Ferrite is a soft phase, and it is effective to constitute a metallic microstructure with ferrite crystal grains with a low dislocation density and high ductility. To obtain such an effect, the area percentage is 5% or more. An area percentage of more than 30%, however, results in significant formation of burrs while shearing because ferrite is easily deformed. Thus, the area percentage of ferrite ranges from 5% to 30%, preferably 8% or more, preferably 25% or less.

The total area percentage of tempered martensite and bainite ranges from 40% to 90%.

The hardness of tempered martensite and bainite is higher than the hardness of ferrite and lower than the hardness of fresh martensite. Thus, fewer voids are formed between a hard phase and a soft phase. To obtain such an effect, the area percentage is 40% or more. An area percentage of more than 90%, however, results in significant formation of burrs while shearing. Thus, the total area percentage of tempered martensite and bainite ranges from 40% to 90%, preferably 50% or more, preferably 80% or less.

Area percentage of Pearlite: 0% to 5%

An area percentage of pearlite of more than 5% results in significant formation of burrs while shearing. Thus, the area percentage of pearlite ranges from 0% to 5%. The area percentage of pearlite can be determined by mirror-polishing and etching a cross section of a test specimen, photographing a rolled cross section of the test specimen with an optical microscope at a magnification of 400 times, and processing the cross-sectional image.

Total Area Percentage of Fresh Martensite and Retained $\gamma$: 5% to 30%

The fresh martensite is a hard phase, is resistant to deformation while shearing, and can suppress the formation of burrs. Retained $\gamma$ in accordance with aspects of the present invention is transformed to fresh martensite even by a small amount of strain. Thus, to obtain the effect of suppressing the formation of burrs, the total area percentage of fresh martensite and retained $\gamma$ is 5% or more. More than 30%, however, tends to result in the formation of voids while processing and results in poor workability. Thus, the total area percentage of fresh martensite and retained $\gamma$ ranges from 5% to 30%.

Fresh martensite cannot be distinguished from retained $\gamma$ with a scanning electron microscope. Thus, in accordance with aspects of the present invention, the total area percentage of fresh martensite and retained $\gamma$ is the area percentage of the microstructure without cementite in grains and with a higher contrast than the ferrite phase when observed with a scanning electron microscope at a magnification of 3000 times.

Ratio of Total Area Percentage of Fresh Martensite and Retained $\gamma$ to Total Area Percentage of Tempered Martensite, Bainite, and Pearlite: 0.5 or Less Hard second phases other than fresh martensite and retained $\gamma$ are tempered martensite, bainite, and pearlite. When the ratio of the total area percentage of fresh martensite and retained $\gamma$ to the total area percentage of tempered martensite, bainite, and pearlite is more than 0.5, this tends to result in the formation of voids while processing and results in poor workability. Thus, the ratio of the total area percentage of fresh martensite and retained γ to the total area percentage of tempered martensite, bainite, and pearlite is 0.5 or less, preferably 0.4 or less.

Ratio of Fresh Martensite and Retained γ Adjacent to Ferrite with Respect to Fresh Martensite and Retained γ: 30% or More in Total Area Percentage When the ratio of fresh martensite and retained γ adjacent to ferrite is less than 30% in total area percentage, burrs are significantly formed. Thus, the ratio of fresh martensite and retained γ adjacent to ferrite with respect to fresh martensite and retained γ is 30% or more, preferably 90% or less, in total area percentage.

A high-strength steel sheet according to aspects of the present invention may have a coated layer on the surface of the steel sheet. The coated layer may be of any type. Examples include hot-dip galvanized layers and galvannealed layers. In the presence of a coated layer, a surface specified in accordance with aspects of the present invention refers to an interface between the coated layer and a steel sheet.

Next, a method for producing a high-strength steel sheet according to aspects of the present invention is described below.

A method for producing a high-strength steel sheet according to aspects of the present invention includes a hot-rolling step, a cold-rolling step, and an annealing step. When a high-strength steel sheet according to aspects of the present invention has a coated layer, a coating step is further included. Each of these steps is described below.

The hot-rolling step is the step of hot-rolling a steel slab with the above component composition, cooling the steel sheet at an average cooling rate in the range of 10° C./s to 30° C./s, and coiling the steel sheet at a coiling temperature in the range of 400° C. to 700° C.

In accordance with aspects of the present invention, steel can be melted by any method, for example, by a known melting method using a converter or an electric furnace. After the melting process, in consideration of problems, such as segregation, a steel slab (steel material) is preferably produced by a continuous casting process. A steel slab may also be produced by a known casting process, such as an ingot making and blooming process or a thin slab continuous casting process. When the steel slab is hot-rolled after casting, the steel slab may be reheated in a furnace before rolling or may be directly rolled without being heated if a predetermined temperature or higher is maintained.

The steel material thus produced is subjected to hot rolling including rough rolling and finish rolling. In accordance with aspects of the present invention, carbides in the steel are preferably dissolved before rough rolling. Thus, the steel slab is preferably heated to 1100° C. or more to dissolve carbides or prevent an increase in rolling force. The steel slab is preferably heated to 1300° C. or less to prevent an increase in scale loss. As described above, when the steel before rough rolling has a predetermined temperature or more and when carbides in the steel are dissolved, the steel material is not necessarily heated before rough rolling. The rough rolling conditions are not particularly limited. The finish rolling is also not particularly limited.

Average Cooling Rate after Hot Rolling: 10° C./s to 30° C./s

When the average cooling rate to the coiling temperature after hot rolling is less than 10° C./s, ferrite grains do not grow, and workability is reduced. On the other hand, when the average cooling rate is more than 30° C./s, ferrite grains grow excessively, and burrs are easily formed while shearing. Thus, the average cooling rate ranges from 10° C./s to 30° C./s, preferably 15° C. or more, preferably 25° C./s or less.

Coiling Temperature: 400° C. to 700° C.

A coiling temperature of less than 400° C. results in the formation of a low-temperature transformed phase, such as bainite, and a decreased amount of fresh martensite, and tends to result in the formation of burrs while shearing. On the other hand, a coiling temperature of more than 700° C. results in a large ferrite grain size and a decreased strength. Thus, the coiling temperature ranges from 400° C. to 700° C., preferably 500° C. or more, preferably 600° C. or less.

The cold-rolling step is then performed. The cold-rolling step is the step of cold-rolling the hot-rolled steel sheet formed by the above method.

In the cold-rolling step, the rolling reduction is not particularly limited. For example, the rolling reduction is preferably adjusted in the range of 30% to 80%.

The annealing step is then performed. The annealing step is the step of reverse bending the cold-rolled steel sheet formed in the cold-rolling step with a roll 800 mm or less in radius two to five times in total in a temperature range of 600° C. to an annealing temperature, then annealing the cold-rolled steel sheet in the annealing temperature range of 750° C. to 900° C. for an annealing time in the range of 30 to 200 seconds, cooling the cold-rolled steel sheet from the annealing temperature to the temperature range of 200° C. to 340° C. at an average cooling rate of 10° C./s or more, reheating the cold-rolled steel sheet to the temperature range of 350° C. to 600° C., and holding the temperature for 10 to 300 seconds.

Perform Reverse Bending Two to Five Times in Total with a Roll 800 mm or Less in Radius in the Temperature Range of 600° C. to the Annealing Temperature A desired steel microstructure cannot be formed only by simple heating. Without the desired steel microstructure, burrs are significantly formed. Thus, to form a desired steel microstructure, reverse bending are performed in the high temperature range of 600° C. to the annealing temperature to promote the nucleation of a second phase. It was found that the reverse bending could adjust the ratio of the total area percentage of fresh martensite and retained γ to the total area percentage of tempered martensite, bainite, and pearlite to 0.5 or less and were related to the reduction of burrs while shearing. To control the ratio of the total area percentage of fresh martensite and retained γ to the total area percentage of tempered martensite, bainite, and pearlite to 0.5 or less, the roll size should be 800 mm or less in radius, preferably 700 mm or less. The roll size is preferably 200 mm or more. When the number of times of reverse bending is more than five or less than two, the ratio of the total area percentage of fresh martensite and retained γ to the total area percentage of tempered martensite, bainite, and pearlite is more than 0.5. Thus, the number of times of reverse bending ranges from two to five, preferably four or less. The number of times of reverse bending is not the number of reverse bending cycles but the sum of the number of times of bending and the number of times of unbending. The term "reverse bending" means "bending in one direction and bending in the opposite direction repeatedly.

Annealing Temperature: 750° C. to 900° C., Annealing Time: 30 to 200 Seconds

An annealing temperature of less than 750° C. or a holding time of less than 30 seconds results in slow recovery and an insufficient fresh martensite fraction. On the other hand, an annealing temperature of more than 900° C. results in an increased fresh martensite fraction, a decreased ferrite fraction, and poor workability. An annealing time of more than 200 seconds may result in poor workability due to a large amount of precipitated iron carbide. Thus, the annealing temperature ranges from 750° C. to 900° C., preferably 800° C. or more, preferably 900° C. or less. The holding time ranges from 30 to 200 seconds, preferably 50 seconds or more, preferably 150 seconds or less.

Average Cooling Rate from Annealing Temperature to Temperature Range of 200° C. to 340° C.: 10° C./s or More An average cooling rate of less than 10° C./s results in the growth of ferrite grains and an area percentage of ferrite possibly above 30% and therefore tends to result in the formation of burrs. Cooling from the annealing temperature to a temperature range of less than 200° C. results in a decreased total area percentage of fresh martensite and retained γ and tends to result in the formation of burrs. On the other hand, cooling to a temperature range of more than 340° C. results in an increased total area percentage of fresh martensite and retained γ and poor workability. Thus, the average cooling rate from the annealing temperature to the temperature range of 200° C. to 340° C. is 10° C./s or more. The upper limit is preferably, but is not limited to, 100° C./s or less.

Reheating Temperature: 350° C. to 600° C., Reheating Time: 10 to 300 Seconds

Reheating in a temperature range of less than 350° C. results in no fresh martensite and no retained γ and tends to result in the formation of burrs. On the other hand, reheating at more than 600° C. results in an increased area percentage of hard second phases other than fresh martensite and retained γ, failing to form desired fresh martensite and retained γ, and tends to result in the formation of burrs. A reheating time (holding time) of more than 300 seconds is undesirable in terms of productivity and results in promoted bainite transformation and a decreased strength. On the other hand, a reheating time (holding time) of less than 10 seconds results in a total area percentage of the fresh martensite and the retained γ adjacent to ferrite below 30%. Thus, the reheating temperature ranges from 350° C. to 600° C., and the holding time ranges from 10 to 300 seconds.

The annealing step may be followed by a coating step of coating the surface of the steel sheet. As described above, the coated layer may be of any type in accordance with aspects of the present invention. Thus, the coating treatment may also be of any type. Examples include a hot-dip galvanizing treatment and an alloying treatment including alloying after the hot-dip galvanizing treatment (galvannealing treatment).

Examples

Slabs with component compositions listed in Table 1 were subjected to hot rolling, cold rolling, and annealing under the conditions listed in Table 2 to produce steel sheets. The roll size for reverse bending in the annealing step was 425 mm in radius. The steel sheets produced under the conditions listed in Table 2 were immersed in a coating bath to form 20 to 80 g/m² of a hot-dip galvanized layer. Part of the steel sheets were subjected to an alloying treatment after the formation of the hot-dip galvanized layer to form galvannealed steel sheets. The coating treatment was followed by cooling. The material classes are also listed in Table 2. Examination methods are described below.

TABLE 1

| Steel designation | Component composition (mass %) | | | | | | | | | | |
|---|---|---|---|---|---|---|---|---|---|---|---|
| | C | Si | Mn | P | S | Al | N | B | Ti | Nb | Others |
| A | 0.126 | 0.61 | 2.62 | 0.01 | 0.001 | 0.03 | 0.003 | 0.002 | 0.02 | 0.015 | — |
| B | 0.135 | 0.63 | 2.68 | 0.02 | 0.001 | 0.03 | 0.004 | 0.002 | 0.02 | 0.018 | Sn:0.004,Cu:0.05 |
| C | 0.140 | 0.53 | 2.72 | 0.02 | 0.002 | 0.04 | 0.003 | — | 0.03 | 0.016 | V:0.001 |
| D | 0.062 | 0.62 | 2.31 | 0.01 | 0.001 | 0.06 | 0.004 | 0.001 | 0.02 | 0.012 | — |
| E | 0.122 | 0.65 | 2.30 | 0.02 | 0.002 | 0.04 | 0.002 | 0.002 | 0.02 | 0.040 | Cr:0.15 |
| F | 0.092 | 1.10 | 2.90 | 0.02 | 0.001 | 0.04 | 0.005 | 0.001 | 0.01 | 0.011 | — |
| G | 0.125 | 1.66 | 2.62 | 0.02 | 0.018 | 0.04 | 0.009 | 0.003 | 0.01 | 0.006 | Ni:0.010 |
| H | 0.132 | 0.64 | 2.69 | 0.01 | 0.001 | 0.03 | 0.003 | 0.002 | 0.01 | 0.021 | — |
| I | 0.100 | 0.69 | 2.65 | 0.01 | 0.001 | 0.04 | 0.004 | 0.001 | 0.02 | — | Mo:0.12 |
| J | 0.261 | 0.52 | 2.10 | 0.01 | 0.008 | 0.03 | 0.005 | 0.004 | 0.02 | — | — |
| K | 0.011 | 0.80 | 1.52 | 0.02 | 0.003 | 0.05 | 0.006 | 0.002 | 0.01 | 0.049 | — |
| L | 0.115 | 0.60 | 2.70 | 0.01 | 0.001 | 0.03 | 0.004 | 0.001 | 0.02 | 0.022 | Pb:0.004,Cs:0.005 |
| M | 0.099 | 1.89 | 2.73 | 0.02 | 0.002 | 0.03 | 0.005 | 0.003 | 0.01 | — | — |
| N | 0.095 | 0.004 | 2.40 | 0.01 | 0.001 | 0.05 | 0.003 | 0.001 | 0.03 | 0.032 | — |
| O | 0.131 | 0.85 | 2.68 | 0.02 | 0.002 | 0.05 | 0.005 | 0.004 | 0.02 | 0.021 | Ta:0.005,Hf:0.004 |
| P | 0.079 | 0.52 | 3.32 | 0.01 | 0.002 | 0.04 | 0.004 | 0.001 | 0.02 | 0.026 | — |
| Q | 0.072 | 0.82 | 2.50 | 0.01 | 0.008 | 0.05 | 0.004 | 0.002 | 0.02 | 0.020 | As:0.006,Cr:0.12 |
| R | 0.109 | 0.58 | 2.75 | 0.02 | 0.001 | 0.04 | 0.005 | 0.004 | 0.03 | 0.015 | REM:0.24 |
| S | 0.102 | 0.64 | 2.75 | 0.01 | 0.001 | 0.06 | 0.003 | 0.002 | 0.01 | 0.024 | W:0.006 |
| T | 0.130 | 0.76 | 2.30 | 0.01 | 0.002 | 0.03 | 0.005 | 0.004 | 0.02 | — | Zn:0.08,V:0.05 |
| U | 0.112 | 0.98 | 2.50 | 0.02 | 0.003 | 0.09 | 0.004 | 0.001 | 0.03 | 0.012 | Ca:0.003 |
| V | 0.123 | 1.31 | 2.80 | 0.02 | 0.002 | 0.04 | 0.007 | 0.004 | 0.03 | 0.025 | Co:0.011 |
| W | 0.121 | 0.20 | 2.76 | 0.01 | 0.001 | 0.06 | 0.003 | 0.005 | 0.03 | 0.015 | Sb:0.004 |
| X | 0.121 | 0.62 | 3.10 | 0.02 | 0.002 | 0.05 | 0.004 | 0.002 | — | — | Mg:0.0008 |
| Y | 0.122 | 0.65 | 2.22 | 0.02 | 0.001 | 0.05 | 0.005 | — | 0.02 | — | Sr:0.006 |
| Z | 0.108 | 0.60 | 2.60 | 0.01 | 0.002 | 0.04 | 0.003 | — | — | 0.050 | — |
| AA | 0.118 | 0.65 | 2.65 | 0.02 | 0.002 | 0.03 | 0.005 | 0.001 | 0.02 | 0.080 | — |
| AB | 0.123 | 0.64 | 2.58 | 0.02 | 0.002 | 0.03 | 0.004 | 0.001 | 0.02 | 0.003 | — |

*The underlines are outside the scope of the present invention.

TABLE 2

| No. | Steel designation | Hot rolling Slab heating temperature (° C.) | Hot rolling Finishing temperature (° C.) | Hot rolling Average cooling rate (° C./s) | Hot rolling Coiling temperature (° C.) | Cold rolling Rolling reduction (%) | Number of times of reverse bending with roll 800 mm or less in radius | Annealing Annealing temperature (° C.) |
|---|---|---|---|---|---|---|---|---|
| 1 | A | 1250 | 900 | 22 | 520 | 45 | 4 | 790 |
| 2 | A | 1250 | 900 | 20 | 500 | 46 | 4 | 805 |
| 3 | A | 1250 | 900 | 9 | 500 | 55 | 3 | 810 |
| 4 | A | 1250 | 900 | 35 | 500 | 55 | 3 | 810 |
| 5 | B | 1250 | 900 | 25 | 510 | 50 | 3 | 800 |
| 6 | B | 1250 | 900 | 20 | 500 | 50 | 4 | 810 |
| 7 | B | 1250 | 900 | 22 | 360 | 50 | 3 | 815 |
| 8 | B | 1250 | 900 | 22 | 720 | 50 | 3 | 815 |
| 9 | C | 1250 | 900 | 22 | 510 | 45 | 4 | 790 |
| 10 | C | 1250 | 900 | 22 | 510 | 45 | 4 | 780 |
| 11 | C | 1250 | 900 | 22 | 510 | 45 | 1 | 790 |
| 12 | C | 1250 | 900 | 20 | 510 | 45 | 6 | 790 |
| 13 | D | 1250 | 900 | 18 | 500 | 50 | 2 | 810 |
| 14 | E | 1250 | 900 | 25 | 510 | 45 | 4 | 790 |
| 15 | E | 1250 | 900 | 25 | 510 | 45 | 4 | 730 |
| 16 | E | 1250 | 900 | 25 | 510 | 45 | 4 | 910 |
| 17 | E | 1250 | 900 | 25 | 510 | 45 | 4 | 790 |
| 18 | E | 1250 | 900 | 25 | 510 | 45 | 4 | 790 |
| 19 | F | 1250 | 900 | 22 | 500 | 50 | 3 | 790 |
| 20 | G | 1250 | 900 | 25 | 510 | 45 | 4 | 790 |
| 21 | H | 1250 | 900 | 20 | 520 | 50 | 3 | 800 |
| 22 | H | 1250 | 900 | 20 | 520 | 50 | 3 | 800 |
| 23 | H | 1250 | 900 | 20 | 520 | 50 | 3 | 825 |
| 24 | H | 1250 | 900 | 20 | 520 | 50 | 3 | 700 |
| 25 | I | 1250 | 900 | 20 | 510 | 50 | 3 | 820 |
| 26 | J | 1250 | 900 | 25 | 510 | 45 | 4 | 830 |
| 27 | K | 1250 | 900 | 22 | 560 | 50 | 3 | 800 |
| 28 | L | 1250 | 900 | 20 | 510 | 50 | 3 | 790 |
| 29 | L | 1250 | 900 | 20 | 510 | 50 | 3 | 790 |
| 30 | L | 1250 | 900 | 20 | 510 | 50 | 3 | 790 |
| 31 | M | 1250 | 900 | 15 | 520 | 50 | 3 | 790 |
| 32 | N | 1250 | 900 | 15 | 520 | 50 | 3 | 790 |
| 33 | O | 1250 | 900 | 25 | 510 | 50 | 3 | 800 |
| 34 | O | 1250 | 900 | 25 | 510 | 50 | 3 | 800 |
| 35 | O | 1250 | 900 | 25 | 510 | 50 | 3 | 800 |
| 36 | P | 1250 | 900 | 22 | 500 | 50 | 3 | 790 |
| 37 | Q | 1250 | 900 | 22 | 500 | 50 | 3 | 790 |
| 38 | R | 1250 | 900 | 25 | 510 | 40 | 4 | 820 |
| 39 | S | 1250 | 900 | 20 | 520 | 50 | 4 | 820 |
| 40 | T | 1250 | 900 | 20 | 500 | 45 | 4 | 810 |
| 41 | U | 1250 | 900 | 20 | 510 | 50 | 3 | 780 |
| 42 | V | 1250 | 900 | 20 | 520 | 40 | 3 | 800 |
| 43 | W | 1250 | 900 | 20 | 520 | 40 | 3 | 800 |
| 44 | X | 1250 | 900 | 20 | 520 | 40 | 3 | 790 |
| 45 | Y | 1250 | 900 | 20 | 520 | 40 | 3 | 790 |
| 46 | Z | 1250 | 900 | 20 | 500 | 40 | 4 | 800 |
| 47 | AA | 1250 | 900 | 20 | 500 | 40 | 4 | 800 |
| 48 | AB | 1250 | 900 | 20 | 500 | 40 | 4 | 800 |

| No. | Annealing time (s) | Annealing Average cooling rate (° C./s) | Annealing Cooling stop temperature (° C.) | Reheating temperature (° C.) | Holding time at reheating temperature (s) | Material class | Note |
|---|---|---|---|---|---|---|---|
| 1 | 80 | 16 | 200 | 405 | 30 | GA | Exemplary steel |
| 2 | 85 | 18 | 210 | 410 | 30 | GA | Exemplary steel |
| 3 | 85 | 20 | 200 | 405 | 32 | GA | Comparative steel |
| 4 | 85 | 20 | 200 | 405 | 32 | GA | Comparative steel |
| 5 | 80 | 25 | 220 | 410 | 40 | GA | Exemplary steel |
| 6 | 80 | 25 | 210 | 400 | 40 | GA | Exemplary steel |
| 7 | 80 | 25 | 230 | 450 | 45 | GA | Comparative steel |
| 8 | 80 | 25 | 230 | 450 | 40 | GA | Comparative steel |
| 9 | 85 | 18 | 220 | 420 | 25 | GA | Exemplary steel |
| 10 | 85 | 18 | 220 | 420 | 30 | GA | Exemplary steel |
| 11 | 85 | 18 | 220 | 420 | 35 | GA | Comparative steel |
| 12 | 85 | 18 | 220 | 420 | 40 | GA | Comparative steel |

TABLE 2-continued

| | | | | | | | |
|---|---|---|---|---|---|---|---|
| <u>13</u> | 90 | 25 | 250 | 420 | 50 | GI | Comparative steel |
| 14 | 80 | 18 | 200 | 405 | 35 | GA | Exemplary steel |
| <u>15</u> | 80 | 18 | 200 | 405 | 35 | GA | Comparative steel |
| <u>16</u> | 80 | 18 | 200 | 405 | 35 | GA | Comparative steel |
| <u>17</u> | <u>20</u> | 18 | 200 | 405 | 35 | GA | Comparative steel |
| <u>18</u> | <u>220</u> | 18 | 200 | 405 | 35 | GA | Comparative steel |
| 19 | 80 | 25 | 330 | 500 | 75 | GA | Exemplary steel |
| 20 | 85 | 20 | 210 | 410 | 35 | GA | Exemplary steel |
| 21 | 70 | 20 | 250 | 420 | 30 | GA | Exemplary steel |
| <u>22</u> | 70 | <u>6</u> | 250 | 420 | 30 | GA | Comparative steel |
| <u>23</u> | 70 | <u>20</u> | <u>170</u> | 420 | 30 | GA | Comparative steel |
| <u>24</u> | 70 | 20 | <u>360</u> | 420 | 30 | GA | Comparative steel |
| 25 | 90 | 25 | <u>300</u> | 510 | 40 | GA | Exemplary steel |
| <u>26</u> | 80 | 20 | 200 | 410 | 35 | GI | Comparative steel |
| <u>27</u> | 80 | 20 | 200 | 420 | 35 | GA | Comparative steel |
| 28 | 80 | 20 | 210 | 400 | 40 | GA | Exemplary steel |
| <u>29</u> | 80 | 20 | 210 | <u>320</u> | 40 | GA | Comparative steel |
| <u>30</u> | 80 | 20 | 210 | <u>620</u> | 40 | GA | Comparative steel |
| <u>31</u> | 80 | 18 | 200 | <u>405</u> | 35 | GI | Comparative steel |
| <u>32</u> | 80 | 18 | 200 | 405 | 35 | GI | Comparative steel |
| <u>33</u> | 80 | 25 | 220 | 410 | 40 | GA | Exemplary steel |
| 34 | 80 | 25 | 220 | 410 | <u>5</u> | GA | Comparative steel |
| <u>35</u> | 80 | 25 | 220 | 410 | <u>320</u> | GA | Comparative steel |
| <u>36</u> | 80 | 25 | 330 | 500 | 75 | CR | Comparative steel |
| 37 | 80 | 25 | 330 | 500 | 75 | GA | Exemplary steel |
| 38 | 80 | 20 | 220 | 420 | 30 | GA | Exemplary steel |
| 39 | 85 | 20 | 220 | 420 | 30 | GI | Exemplary steel |
| 40 | 80 | 22 | 200 | 400 | 30 | GA | Exemplary steel |
| 41 | 85 | 25 | 200 | 410 | 30 | GI | Exemplary steel |
| 42 | 80 | 22 | 250 | 420 | 50 | GA | Exemplary steel |
| 43 | 80 | 22 | 250 | 420 | 50 | GI | Exemplary steel |
| 44 | 75 | 25 | 250 | 410 | 45 | GI | Exemplary steel |
| 45 | 75 | 25 | 250 | 410 | 45 | CR | Exemplary steel |
| 46 | 75 | 25 | 200 | 400 | 35 | CR | Exemplary steel |
| <u>47</u> | 75 | 25 | 200 | 400 | 35 | GA | Comparative steel |
| <u>48</u> | 75 | 25 | 200 | 400 | 35 | GA | Comparative steel |

* The underlines are outside the scope of the present invention.

(1) Observation of Microstructure

A thickness cross-section of the steel sheets in the rolling direction was polished to show corrosion with 1% by mass nital. Ten fields from the surface to a portion with a thickness of ¼t are photographed with a scanning electron microscope at a magnification of 3000 times and are subjected to an intercept method according to ASTM E 112-10. "t" denotes the thickness of the steel sheet (sheet thickness). Ferrite is a microstructure without corrosion marks or cementite observed in grains. Tempered martensite and bainite are microstructures with many fine iron-based carbide and corrosion marks observed in crystal grains. Fresh martensite (FM) and retained γ are microstructures without carbide observed in grains and microstructures observed with a higher contrast than ferrite.

The area percentage of ferrite, the total area percentage of tempered martensite and bainite, the total area percentage of fresh martensite and retained γ, and the ratio of fresh martensite and retained γ adjacent to ferrite with respect to fresh martensite and retained γ were determined by image analysis of results observed with the scanning electron microscope. The area percentage of ferrite was determined by extracting only the ferrite portion in each microstructure field, determining the area percentage occupied by ferrite with respect to the observation field area, and averaging the area percentages of 10 fields. The total area percentage of tempered martensite and bainite was determined by extracting only the tempered martensite and bainite portions in each observation field, determining the area percentage occupied by the tempered martensite and bainite with respect to the observation field area, and averaging the area percentages of 10 fields. Likewise, the total area percentage of fresh martensite and retained γ was determined by extracting only the fresh martensite and retained γ portions in each observation field, determining the area percentage occupied by the fresh martensite and retained γ with respect to the observation field area, and averaging the area percentages of 10 fields. "The ratio of fresh martensite and retained γ adjacent to ferrite with respect to fresh martensite and retained γ" was determined by identifying fresh martensite and retained γ adjacent to ferrite by image analysis in each observation field, determining the area percentage, dividing the area percentage by the total area of fresh martensite and retained γ present in the observation field to determine "the ratio of fresh martensite and retained γ adjacent to ferrite with respect to fresh martensite and retained γ", and averaging the ratios of 10 fields. Pearlite was observed as another phase.

(2) Tensile Properties

A tensile test according to JIS Z 2241 was performed five times using No. 5 test specimens described in JIS Z 2201 having a longitudinal direction (tensile direction) that formed an angle of 90 degrees with the rolling direction. The average yield strength (YP), tensile strength (TS), and butt elongation (EL) were determined.

(3) Evaluation Test for Burr 50 mm×100 mm test specimens were taken from the steel sheet in the rolling direction and in the direction that formed an angle of 90 degrees with the rolling direction, and were sheared. The burr height of the sheared surface was measured. The average burr height was determined from ten measurements. An average burr height of 5 μm or less was rated as " ⊙ ", an average burr height of more than 5 μm and less than 15 μm was rated as "○", and an average burr height of 15 μm or more was rated as "X".

Table 3 shows the results.

TABLE 3

| | | | | | Properties of steel sheet microstructure | | | | | | | |
|---|---|---|---|---|---|---|---|---|---|---|---|---|
| | | | | | (FM + retained γ)/ | FM + retained | Properties of steel sheet | | | Average | | |
| No. | Ferrite (%) | Tempered M + bainite (%) | Pearlite (%) | FM + retained γ (%) | (tempered M + bainite + pearlite) | γ adjacent to ferrite (%) | YP (MPa) | TS (MPa) | EL (%) | burr height | Note | |
| 1 | 18 | 73 | 0 | 9 | 0.12 | 85 | 720 | 980 | 13.8 | ⊙ | Exemplary steel |
| 2 | 15 | 75 | 0 | 10 | 0.13 | 80 | 800 | 985 | 13.2 | ⊙ | Exemplary steel |
| 3 | <u>4</u> | 60 | 3 | <u>33</u> | <u>0.52</u> | <u>15</u> | 850 | 1190 | 10.2 | × | Comparative steel |
| 4 | <u>21</u> | 70 | 5 | <u>4</u> | <u>0.05</u> | <u>20</u> | 600 | 920 | 14.5 | × | Comparative steel |
| 5 | 8 | 80 | 1 | <u>11</u> | 0.14 | 40 | 800 | 1020 | 13.2 | ⊙ | Exemplary steel |
| 6 | 6 | 83 | 1 | 10 | 0.12 | 45 | 890 | 1030 | 11.2 | ○ | Exemplary steel |
| 7 | <u>4</u> | <u>91</u> | 1 | <u>4</u> | 0.04 | <u>20</u> | 700 | 900 | 10.3 | × | Comparative steel |
| 8 | <u>52</u> | <u>38</u> | 7 | <u>3</u> | 0.07 | <u>25</u> | <u>520</u> | 780 | 14.5 | × | Comparative steel |
| 9 | <u>7</u> | <u>78</u> | 3 | <u>12</u> | 0.15 | <u>70</u> | <u>790</u> | 1040 | 13.5 | ⊙ | Exemplary steel |
| 10 | 13 | 76 | 0 | 11 | 0.14 | 75 | 740 | 1035 | 13.2 | ⊙ | Exemplary steel |
| 11 | 10 | 50 | <u>9</u> | <u>31</u> | <u>0.53</u> | <u>28</u> | 700 | 1025 | 13.8 | × | Comparative steel |
| 12 | 18 | 46 | <u>3</u> | <u>33</u> | <u>0.67</u> | <u>25</u> | 710 | 1020 | 14.0 | × | Comparative steel |
| 13 | <u>60</u> | <u>36</u> | 1 | <u>3</u> | 0.08 | <u>15</u> | <u>500</u> | 750 | 16.2 | × | Comparative steel |
| 14 | 16 | 74 | 0 | 10 | 0.14 | 82 | 710 | 990 | 14.0 | ⊙ | Exemplary steel |
| 15 | <u>35</u> | 60 | 1 | <u>4</u> | 0.07 | <u>25</u> | <u>540</u> | 800 | 14.8 | × | Comparative steel |
| 16 | <u>2</u> | 87 | 1 | 10 | 0.11 | <u>2</u> | 1000 | 1060 | 10.5 | × | Comparative steel |
| 17 | <u>32</u> | 62 | 2 | <u>4</u> | 0.06 | <u>22</u> | <u>545</u> | 820 | 14.6 | × | Comparative steel |
| 18 | <u>2</u> | 86 | 0 | <u>12</u> | 0.14 | <u>2</u> | 900 | 1040 | 10.2 | × | Comparative steel |
| 19 | 20 | 58 | 2 | 20 | 0.33 | 40 | 580 | 820 | 15.2 | ○ | Exemplary steel |
| 20 | 15 | 74 | 0 | 11 | 0.15 | 85 | 720 | 1030 | 14.3 | ○ | Exemplary steel |
| 21 | 13 | 77 | 0 | 10 | 0.13 | 86 | 750 | 1040 | 14.5 | ⊙ | Exemplary steel |
| 22 | <u>35</u> | 53 | 3 | 9 | 0.16 | <u>25</u> | <u>540</u> | 860 | 15.6 | × | Comparative steel |
| 23 | 6 | <u>92</u> | 0 | <u>2</u> | 0.02 | <u>20</u> | 800 | 1020 | 13.3 | × | Comparative steel |
| 24 | 20 | <u>38</u> | <u>7</u> | <u>35</u> | <u>0.78</u> | <u>20</u> | 820 | 1080 | 11.1 | × | Comparative steel |
| 25 | 13 | <u>71</u> | <u>1</u> | 15 | <u>0.21</u> | 60 | 790 | 1010 | 13.4 | ○ | Exemplary steel |
| 26 | <u>2</u> | <u>91</u> | 3 | 4 | 0.04 | <u>10</u> | 900 | 1250 | 10.8 | × | Comparative steel |
| 27 | <u>35</u> | <u>57</u> | 2 | <u>6</u> | 0.10 | <u>25</u> | <u>540</u> | 760 | 16.2 | × | Comparative steel |
| 28 | 16 | 72 | 2 | 10 | 0.14 | 82 | 710 | 960 | 14.2 | ⊙ | Exemplary steel |
| 29 | 13 | 72 | <u>11</u> | 4 | 0.05 | <u>20</u> | 620 | 850 | 13.8 | × | Comparative steel |
| 30 | 15 | 78 | <u>3</u> | <u>4</u> | 0.05 | <u>20</u> | 600 | 830 | 13.6 | × | Comparative steel |
| 31 | 20 | 30 | <u>22</u> | <u>28</u> | <u>0.54</u> | <u>52</u> | 850 | 1020 | 10.3 | × | Comparative steel |
| 32 | <u>35</u> | <u>50</u> | <u>1</u> | 14 | <u>0.27</u> | 50 | <u>520</u> | 760 | 15.8 | × | Comparative steel |
| 33 | 10 | 76 | 1 | 13 | 0.17 | 45 | 810 | 1020 | 13.5 | ⊙ | Exemplary steel |
| 34 | 13 | 50 | 3 | <u>34</u> | <u>0.64</u> | <u>22</u> | 780 | 980 | 13.3 | × | Comparative steel |
| 35 | 7 | 60 | 1 | <u>31</u> | <u>0.51</u> | <u>25</u> | <u>540</u> | 800 | 14.6 | × | Comparative steel |
| 36 | 6 | 57 | 2 | <u>35</u> | <u>0.59</u> | 35 | <u>575</u> | 810 | 14.8 | × | Comparative steel |
| 37 | 8 | 59 | 5 | 28 | 0.44 | 33 | 560 | 800 | 14.8 | ○ | Exemplary steel |
| 38 | 20 | 68 | 1 | 11 | 0.16 | 68 | 880 | 990 | 12.5 | ⊙ | Exemplary steel |
| 39 | 19 | 64 | 2 | 15 | 0.23 | 70 | 870 | 970 | 13.2 | ⊙ | Exemplary steel |
| 40 | 11 | 81 | 0 | 8 | 0.10 | 75 | 880 | 1030 | 11.8 | ⊙ | Exemplary steel |
| 41 | 20 | 66 | 2 | 12 | 0.18 | 80 | 650 | 960 | 16.2 | ⊙ | Exemplary steel |
| 42 | 19 | 72 | 0 | 9 | 0.13 | 70 | 750 | 1050 | 14.2 | ○ | Exemplary steel |
| 43 | 18 | 70 | 0 | 12 | 0.17 | 75 | 650 | 990 | 15.5 | ○ | Exemplary steel |
| 44 | 18 | 67 | 0 | 15 | 0.22 | 80 | 680 | 1040 | 15.2 | ○ | Exemplary steel |
| 45 | 26 | 62 | 0 | 12 | 0.19 | 60 | 640 | 1030 | 15.6 | ○ | Exemplary steel |
| 46 | 20 | 65 | 1 | 14 | 0.21 | 70 | 730 | 995 | 14.9 | ○ | Exemplary steel |
| 47 | 15 | 70 | 0 | 15 | 0.21 | <u>20</u> | 800 | 1040 | 14.2 | × | Comparative steel |
| 48 | 10 | 80 | <u>6</u> | 4 | 0.05 | <u>10</u> | 650 | 850 | 16.2 | × | Comparative steel |

\* The underlines are outside the scope of the present invention.

Tempered M: tempered martensite

FM: Fresh martensite

All examples of the present invention provided reduced shear burrs, high El, high ductility, and high workability.

The invention claimed is:

1. A high-strength steel sheet that has a component composition comprising, on a mass percent basis:
C: 0.07% to 0.25%,
Si: 0.01% to 1.80%,
Mn: 1.8% to 3.2%,
P: 0.05% or less,
S: 0.02% or less,
Al: 0.01% to 2.0%, and
N: 0.01% or less;
at least one of
B: 0.0001% to 0.005%,
Ti: 0.005% to 0.04%, and
Nb: 0.005% to 0.06%; and
a balance being Fe and incidental impurities,
that has a steel microstructure in which, in a thickness cross-section in a rolling direction, an area percentage of ferrite ranges from 5% to 30%, a total area percentage of tempered martensite and bainite ranges from 40% to 90%, pearlite constitutes 0% to 5%, a total area percentage of fresh martensite and retained γ ranges from 5% to 30%, a ratio of a total area percentage of the fresh martensite and the retained γ to a total area percentage of the tempered martensite, bainite, and pearlite is 0.5 or less, and a ratio of the fresh martensite and the retained γ adjacent to the ferrite with respect to the fresh martensite and the retained γ is 30% or more in total area percentage, and that has a yield strength of 550 MPa or more.

2. The high-strength steel sheet according to claim 1, further comprising: in addition to the component composition, at least one element selected from group A and/or at least one element selected from group B:

group A: at least one of Mo: 0.03% to 0.50% and Cr: 0.1% to 1.0% in a total of 1% or less on a mass percent basis; and group B: a total of 0.5% or less of at least one of Cu, Ni, Sn, As, Sb, Ca, Mg, Pb, Co, Ta, W, REM, Zn, V, Sr, Cs, and Hf on a mass percent basis.

3. The high-strength steel sheet according to claim 1, further comprising a coated layer on a surface of the steel sheet.

4. The high-strength steel sheet according to claim 2, further comprising a coated layer on a surface of the steel sheet.

5. The high-strength steel sheet according to claim 3, wherein the coated layer is a hot-dip galvanized layer or a galvannealed layer.

6. The high-strength steel sheet according to claim 4, wherein the coated layer is a hot-dip galvanized layer or a galvannealed layer.

* * * * *